United States Patent [19]

Brandt et al.

[11] 4,394,235

[45] Jul. 19, 1983

[54] HEAT-SEALABLE POLYPROPYLENE BLENDS AND METHODS FOR THEIR PREPARATION

[75] Inventors: John G. Brandt, Clemmons; Joyce H. Dickerson; William R. Schmitt, both of Winston-Salem, all of N.C.

[73] Assignee: RJ Archer Inc., Winston-Salem, N.C.

[21] Appl. No.: 168,905

[22] Filed: Jul. 14, 1980

[51] Int. Cl.³ .................... C08L 23/12; B29D 7/24; C08J 7/18; C08F 212/08

[52] U.S. Cl. .................... 204/165; 204/159.2; 264/22; 524/232; 524/489; 524/553; 524/554; 524/578; 525/210; 525/232; 525/240

[58] Field of Search ............ 204/159.2, 165; 264/22; 525/210, 232, 240; 260/28.5 A, 18 N, 23 S; 524/232, 489, 553, 554, 578

[56] References Cited

U.S. PATENT DOCUMENTS

| | | | |
|---|---|---|---|
| Re. 29,654 | 5/1978 | Peterson et al. | 526/90 |
| 2,383,084 | 8/1945 | Rummelsburg | 260/86 |
| 2,551,087 | 5/1951 | Barnhart et al. | 260/23 |
| 2,810,933 | 10/1957 | Pierce et al. | 18/48 |
| 2,859,480 | 11/1958 | Berthold et al. | 18/48 |
| 2,881,470 | 4/1959 | Berthold et al. | 18/1 |
| 3,042,971 | 7/1962 | Wolinski | 18/47.5 |
| 3,176,021 | 3/1965 | Vohungis | 260/32.6 |
| 3,205,190 | 9/1965 | Braus et al. | 260/32.6 |
| 3,220,966 | 11/1965 | Flannagan | 260/27 |
| 3,243,396 | 3/1966 | Hammer | 260/28.5 |
| 3,262,808 | 7/1966 | Crooks et al. | 117/47 |
| 3,278,646 | 10/1966 | Lambert, Jr. | 260/897 |
| 3,313,754 | 4/1967 | Logan | 260/27 |
| 3,330,796 | 7/1967 | Mock et al. | 260/32.6 |
| 3,333,032 | 7/1967 | Dickinson | 264/22 |
| 3,361,849 | 1/1968 | Cramer et al. | 200/897 |
| 3,399,156 | 8/1968 | Bell, Jr. | 260/29.1 |
| 3,413,246 | 11/1968 | Weymann et al. | 260/4 |
| 3,453,227 | 7/1969 | Kelly | 260/32.6 |
| 3,470,145 | 9/1969 | Lipman | 260/897 |
| 3,474,063 | 10/1969 | Powell | 260/30.8 |
| 3,522,198 | 7/1970 | Yamada et al. | 260/28.5 |
| 3,536,644 | 10/1970 | Frizelle et al. | 260/28.5 |
| 3,562,291 | 2/1971 | Lutzmann et al. | 260/32.6 |
| 3,663,488 | 5/1972 | Kail | 260/23 H |
| 3,666,836 | 5/1972 | John | 525/210 |
| 3,666,836 | 5/1972 | John | 260/897 A |
| 3,689,597 | 9/1972 | Mahlman | 525/210 |
| 3,703,569 | 11/1972 | Wolkowicz | 264/22 |
| 3,755,502 | 8/1973 | Bullard | 260/897 A |
| 3,773,609 | 11/1973 | Haruta et al. | 161/182 |
| 3,803,065 | 4/1974 | Arai et al. | 260/23 H |
| 3,865,903 | 2/1975 | Nahmias et al. | 260/889 |
| 3,900,538 | 8/1975 | Kawakami et al. | 264/22 |
| 3,900,694 | 8/1975 | Jurrens | 428/513 |
| 3,919,181 | 11/1975 | Petersen et al. | 260/80.78 |
| 3,937,762 | 2/1976 | Nahmias et al. | 525/232 |
| 4,000,102 | 12/1976 | Shima et al. | 260/23 H |
| 4,032,493 | 6/1977 | Pascual | 260/28.5 A |
| 4,072,735 | 2/1978 | Ardemagni | 260/897 A |
| 4,087,505 | 4/1978 | Sugimoto et al. | 264/95 |
| 4,117,193 | 9/1978 | Tsuchiya et al. | 428/339 |
| 4,147,827 | 4/1979 | Breidt et al. | 428/517 |
| 4,166,089 | 8/1979 | De Geest et al. | 264/22 |

FOREIGN PATENT DOCUMENTS

| | | |
|---|---|---|
| 2821733 | 11/1978 | Fed. Rep. of Germany ........ 264/22 |
| 2106633 | 9/1971 | France . |
| 53-35990 | 9/1978 | Japan ..................................... 264/22 |
| 715914 | 9/1954 | United Kingdom . |
| 722875 | 2/1955 | United Kingdom . |
| 1331180 | 1/1971 | United Kingdom . |
| 1550570 | 11/1977 | United Kingdom . |
| 1550570 | 8/1979 | United Kingdom . |

OTHER PUBLICATIONS

Derwent Abst. 25466 V/14, "Heat Sealable PP Film Laminates Contg. Terpene Resins", Mar. 13, 1973, TOYOBO J48028076.
Derwent Abst. 73594 V/42, "Heat Sealable . . . Sep. 19, 1974, TOYO Spinning Co. J74035070.
Derwent Abst. 317W/01 CHISSO Corp. (Feb. 1, 1974), "Polypropylene Film . . . Treated in Corona Discharge", J49011972.
Derwent Abst. 18616W/11 TOYO 2-28-75 J75004380.
Zonatac 105 Resin Arizona Chemical Co.

*Primary Examiner*—John C. Bleutge
*Assistant Examiner*—Herbert J. Lilling
*Attorney, Agent, or Firm*—Jones, Tullar & Cooper

[57] ABSTRACT

This invention relates to blends of polypropylene and styrene-terpene copolymers which provide biaxially oriented, corona discharge treated, heat-sealable films useful in the packaging art.

Preferably the compositions also contain a saturated fatty amide, e.g., stearamide slip agent and/or a Fischer-Tropsch wax.

A process is described when the films after biaxial orientation, are treated by a corona discharge and in some cases heat aged prior to use in the packaging art.

31 Claims, 5 Drawing Figures

HEAT-SEALABLE POLYPROPYLENE BLENDS AND METHODS FOR THEIR PREPARATION

BACKGROUND OF THE INVENTION

The addition of resinous additives to polypropylene has been suggested for several different reasons, including the enhancement of heat-sealing properties.

U.S. Pat. No. 3,666,836 describes the use of hydrogenated polymers or copolymers of styrene to prepare heat-sealable polypropylene films.

U.S. Pat. No. 3,755,502 describes the use of a dipentene-isobutene copolymer in heat-sealable polypropylene composition.

U.S. Pat. No. 3,663,488 describes the use of a polyterpene, hydrogenated polyterpene, or a rosin derivative to provide polypropylene films suitable for twist wrapping.

U.S. Pat. No. 4,032,493 describes enhancing the printability of heat sealable blends of stereoregular polypropylene and a hydrogenated hydrocarbon polymer by the addition of a hydrocarbon wax which can be a Fischer-Tropsch process synthetic wax. Heat aging to improve printability is described.

U.S. Pat. No. 3,361,849 describes a heat sealable blend of polypropylene and a hydrogenated terpene hydrocarbon polymer.

U.S. Pat. No. 3,278,646 describes heat-sealable polypropylene film containing a terpene polymer.

U.S. Pat. No. 3,536,644 describes the use of low molecular weight polyethylene waxes in polypropylene blends to impart heat-sealability, and also discloses that, in that combination, the addition of slip additives also enhances heat-sealing characteristics.

DESCRIPTION OF THE INVENTION

This invention relates to blends of polypropylene and styrene-terpene copolymers which provide biaxially oriented, corona discharge treated, heat-sealable films useful in the packaging art.

Preferably the compositions also contain a saturated fatty amide slip agent, preferably stearamide and/or a Fischer-Tropsch wax.

The heat-sealable films are prepared by a process in which the films, after biaxial orientation, are treated by a corona discharge, and in some cases heat aged prior to use in the packaging art.

The polypropylene useful in the blends of this invention is extrudable, film forming stereoregular polypropylene which term includes not only the propylene homopolymer, otherwise called isotactic or crystalline polypropylene, but also the crystalline copolymer of propylene with minor amounts of another olefin such as ethylene or butene-1, commonly sold in the trade as polypropylene inasmuch as the presence of the comonomer is not sufficient to materially alter the basic characteristics of the polymer. A particularly useful polypropylene is isotactic polypropylene which contains a small amount i.e. about 2 to about 6% amorphous polypropylene.

The presently preferred polypropylene is a commercially available resin which has a weight average molecular weight ($\overline{M}_w$) of 257,000; a number average molecular weight ($\overline{M}_n$) of 23,000, the dispersity ($M_w/M_n$) being approximately 11 as measured by Walters Associates, Milford, Mass.; a melt flow of approximately 9; a glass transition temperature of $-4°$ F. and a melting point of 331° F.; and contains about 4.5% amorphous polypropylene.

The terpene copolymers that can be blended with polypropylene in accordance with the invention are thermoplastic resinous products obtained by polymerizing a mixture of monomers comprising a cyclic monoterpene hydrocarbon monomer and styrene or a substituted styrene i.e. a styrenic monomer. The cyclic monoterpene hydrocarbon component may consist of a single cyclic such as dipentene, limonene, a-pinene, B-pinene, carene, or a phellandrene; a mixture of cyclic monoterpene hydrocarbons and acyclic terpene, such as allo-ocimene, and/or with terpene oligomers. The useful comonomers include styrene, alkyl-styrenes having fewer than 13 carbon atoms, alkenylstyrenes having fewer than 13 carbon atoms, chlorostyrenes and mixtures thereof. Illustrative of these substituted styrenes are a-methylstyrene, a-butylstyrene, a,2-dimethylstyrene, ethylstyrene, a-chlorostyrene, 3-chlorostyrene and the like. Examples of such polymers and a method of their preparation are set forth in U.S. Pat. No. 3,413,246, which is hereby incorporated by reference.

A preferred group of terpene copolymers for use in the blends of the invention are those prepared from B-pinene or preferably dipentene (or limonene) and styrene.

Useful terpene copolymers comprise those containing about 25%–85% of the terpene component derived units and about 75% to about 15% of the styrenic comonomer derived units, and preferably about 40%–85%, and most preferably about 65%–85% of terpene component derived units, and about 60%–15%, and most preferably about 35%–15% of styrenic monomer derived units.

The copolymers generally have a molecular weight of above about 300 and preferably above about 500 as measured by GPC with long chain hydrocarbon for calibration and have a ball and ring softening point (°C.) between about 85 and about 140; preferably between about 100 and about 120.

A particularly useful copolymer is believed to be a styrene-dipentene (or limonene) copolymer having the following typical properties; color (1963 Gardner, 50% heptane) 3; softening point, ring and ball 221° F. (105° C.); toluene insolubles-0.1% maximum; chlorine content (Beilstein)-neg.; a $\overline{M}_w$ of 643 and a $\overline{M}_n$ of 525. Another particularly useful copolymer is the above copolymer which has been further steam distilled to remove approximately 4.5 weight percent residual dimer, increasing the ring and ball softening point to approximately 243° F. (115° C.) (referred to hereinafter as copolymer A). These resins are believed to contain about 75% dipentene units and 25% styrene units.

The Fischer-Tropsch process wax which is optionally, but preferably employed in the compositions of this invention are those melting in the range of 180°–230° F. These materials are well known in the art. The presently preferred Fischer-Tropsch wax is Paraflint H-1, which is a hard, white, brittle high melting point inert synthetic wax produced by the Fischer-Tropsch process. It is free of aromatics and consists of saturated hydrocarbons ranging from C33 upwards, with an average carbon number of C=and a congealing point of 205° F.

The presence of the Fischer-Tropsch wax generally enhances blocking characteristics as well as the functioning of the slip agent, when present; but is not necessary to develop the heat seal properties of the films. The amount of wax employed is a small antiblocking and/or slip agent functioning enhancing amount.

The blends of the invention preferably also contain a saturated fatty amide slip agent such as behenamide or stearamide in a coefficient of friction reducing amount typically in a range of about 0.02% to about 0.075% by weight of the total composition. Surprisingly it has been found that similar unsaturated materials such as erucamide do not provide a desirable coefficient of friction reduction without adversely affecting the heat-seal properties.

In addition, it has been found useful to add to the compositions a small antiblocking contributing amount of a particulate antiblocking agent preferably an aluminum silicate, preferably having an oleophilic surface treatment. These antiblocking agents are typically employed in a range of about 0.05% to about 0.8% by weight of the total composition. Other particulate antiblocking agents known in the art may also be employed.

The blends of the invention preferably will also contain, in most cases, heat and light stabilizers for the polymer, as is customary in the polyolefin art. Any of the heat and light stabilizers normally employed for this purpose can be employed.

Generally the preferred blends of the invention comprise stereoregular polypropylene containing, based on the total weight of the composition:

about 5% to about 25%, preferably about 14% to about 16% of the terpene-styrenic copolymer;

about 0.5% to about 2%, preferably about 1.0% to about 1.8% of the Fischer-Tropsch wax, when present;

about 0% to about 0.1%, preferably about 0.02% to about 0.075% of the saturated fatty amide;

about 0% to about 1% preferably about 0.05% to about 0.08% of the particulate antiblocking agent.

The presently preferred composition of the invention consists of, by weight, 83% of the preferred polypropylene (above); 15% copolymer A (above); 1.5% Paraflint H-1 (Moore and Munger, Inc.); 0.05% Kemamide S-stearamide (Humko Scheffield Chemical) and 0.1% Kaopolite SF-O-treated aluminum silicate (Kaopolite Inc., Garwood, N.J.).

The blended compositions of this invention are particularly useful in the production of oriented films. The presence of the terpene-styrenic copolymer, upon corona treatment, imparts heat-sealability to the polypropylene which is difficult or even impossible to seal, thus making the new films highly useful in the packaging and related arts. Many of the films have the requisite tensile and optical properties as well as the other properties necessary to allow handling of the films on automatic packaging equipment to form a suitable package, for example, a cigarette package overwrap. In general the films have utility as heat-sealable packaging materials.

Preparation of the biaxially oriented films of this invention is readily done by methods well known in the art. For example, the composition can be extruded as a sheet or a tube and then oriented.

In the preferred process of the invention the compositions of the invention are extruded, biaxially oriented, preferably first in the machine direction and then in a tenter frame perpendicular to the machine direction and then subjected to a corona discharge while controlling the film temperature. Then, where the film contains slip agent, the film is heat aged to develop the lubricity of the slip agent.

It is noted that it is necessary that the biaxially oriented films of this invention be treated in a corona discharge to develop adequate heat-sealing characteristics.

The treatment of film materials by corona discharge (sometimes referred to as electric glow discharge) and the apparatus necessary are well known, and need not be discussed here in detail. Examples of references discussing corona discharge treatment include U.S. Pat. Nos. 3,703,569; 3,333,032; 3,042,971; 2,881,470; 2,859,480 and British Pat. Nos. 722,875 and 715,914, all of which are hereby incorporated by reference. Suitable commercial corona treaters are manufactured by the Lepel High Frequency Laboratories, Inc., New York, N.Y. and Pillar Corporation, Milwaukee, Wis.

In the process of the invention the biaxially oriented film is treated by corona discharge in an amount sufficient to enhance the heat-sealing properties of film.

It has also been found that a minimum level of treatment is required. Treatment with an 8 kilowatt Pillar Corp. unit at 5 watts/square foot/per minute was marginal in its effect on the preferred compositions. The use of a 12 kilowatt Pillar Corp. unit at 8 watts/square foot/per minute gave excellent results. The required level of corona discharge for any particular combination readily can be determined in a few statistically designated experiments.

It has also been discovered that, while it has been apparently generally believed that corona discharge treatment effects are enhanced by relatively high temperatures, temperature control of the films of the invention during the corona discharge treatment enhances the heat-sealing properties of the films.

The treater roll (FIGS. 3, 12 and 13) typically used in corona discharge treatment processes is covered with a suitable dielectric materials such as epoxy, fluorinated polyethylene, chlorinated polyethylene or ceramic to prevent the arcing of corona discharge. In a preferred embodiment this roll is operably associated with a heat exchanger, e. g. is also a chill roll, which has water or other approximate cooling fluid circulated therethrough in a manner and at a temperature adapted to control the temperature of the film during the corona discharge treatment. In the Example which follows, if chilled treater-rolls are not employed, or the temperature during corona discharge controlled by other suitable means, film temperatures as high as 185° F. are encountered. Where, as in the Example, chill rolls are employed, the temperature is maintained at about 125° F, resulting in improved heat-sealing characteristics in the resultant film as compared to the heat-sealing characteristic of the uncooled film. Preferably in the process of the invention the film temperature is controlled below about 150° F. and preferably below about 130° F., usually in the range of about ambient temperature to about 130° F.

Another benefit is obtained by temperature control within the corona discharge treatment zone. Winding of the film into a roll at high temperatures results in tremendous pressures being exerted on the underlying film as the roll cools. Unless the gauge of the film is extremely flat and level, any contraction of the film during cooling and further crystallization tends to stretch the film in sections. This is highly undesirable as the distorted film does not perform as well on overwrap machines.

It has been found that, in a preferred embodiment, where slip agent, particularly stearamide is present, it is desirable to heat age the film, for example at between about 100° F. and about 130° F. preferably between about 115° F. and 125° F. for a time sufficient to significantly lower the coefficient of friction of the film. Where the film is heat aged in large rolls about 48 to 96 hours is a typical heat aging time.

In a preferred embodiment of the heat aging step, the film is wound upon a central core adapted to enhance the attainment of temperature equilibrium throughout the rolls. Such a central core can comprise a hollow, relatively heat conductive, e.g. metal, core, which allows passage of air or other heat medium through the core. This allows all points within a roll to develop a satisfactory coefficient of friction not only within a shorter time span, but also within a shorter time span between the time the first point within the roll reaches a predetermined temperature and coefficient of friction and the time that last point within the roll reaches that predetermined temperature, and coefficient of friction. This creates a more uniform heat aging history between points on a roll, which tends to create more uniform overall properties and performance throughout a roll.

EXAMPLE

Figure 1:
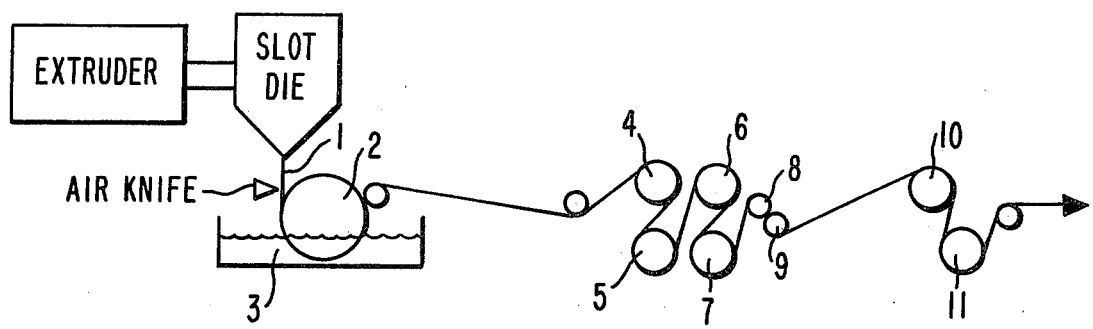
FIG. 1 is a schematic representation of the extrusion and machine direction stretching zones.
Figure 3:
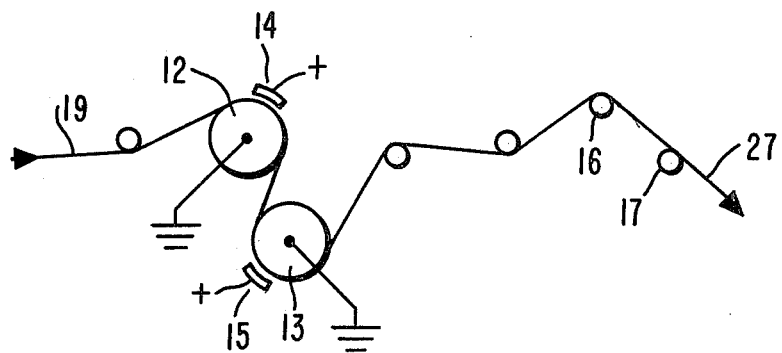
FIG. 3 is a schematic representation of the corona discharge zone.
Figure 2:
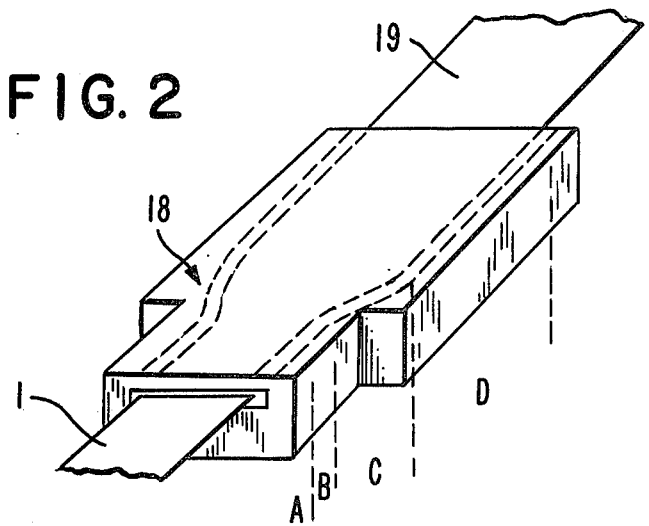
FIG. 2 is a schematic representation of the transverse stretching zone.

The presently preferred composition, described above, was preblended and added in pellet form to an extruder and extruded through a slot die at 450° F. at 20 feet per minute (see FIG. 1) to provide sheet 1 at 40 mils which was applied to a roll 2 at 120° F. with an air knife and passed through a water bath 3 also at 120° F. The water was removed from the resultant solid sheet with an air or vacuum knife. The resultant sheet was then passed over preheated rolls 4 through 7 at 200°-240° F. and fast stretched in a short 80 mil gap between roll 8 at 200°-210° F. and roll 9 at 220°-240° F. in the machine direction at a ratio of 7.5:1 to provide 7 mil sheet and then passed over heated roll 10 at about 225° F. and chill roll 11 at 140°-175° F. The sheet was then passed at 150 feet per minute into a tenter transverse stretcher 18 (see FIG. 2) having a preheat zone A at 325° F., a preheat zone B at 315° F., a stretch zone C at 305° F. and a heat set zone D at 300° F. In the stretch zone the sheet was stretched in the cross direction 8.4 times and then relaxed in the heat set zone to a width equivalent to 7.9 times to provide an 80 to 85 gauge film 19 which was cooled by air to about 90° F., edge trimmed and then passed to a corona discharge treatment zone, (see FIG. 3) wherein the film 19 was subjected to a corona discharge of 8 watts/square foot/per minute while passing over water cooled, dielectric material coated, grounded rolls 12 and 13 operably associated with corona discharge generating elements 14 and 15, leaving roll 13 at a temperature of about 125° F. The corona discharge treated film 27 was wound into a roll (not shown) at 85°-90° F.

Figure 4:
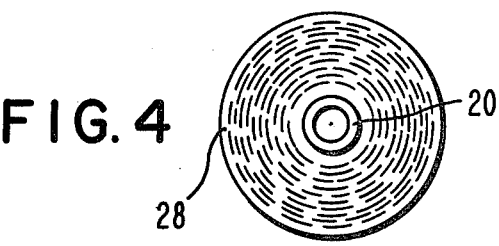
FIG. 4 is a schematic end view of a film roll having an equilibrium enhancing core.
Figure 5:
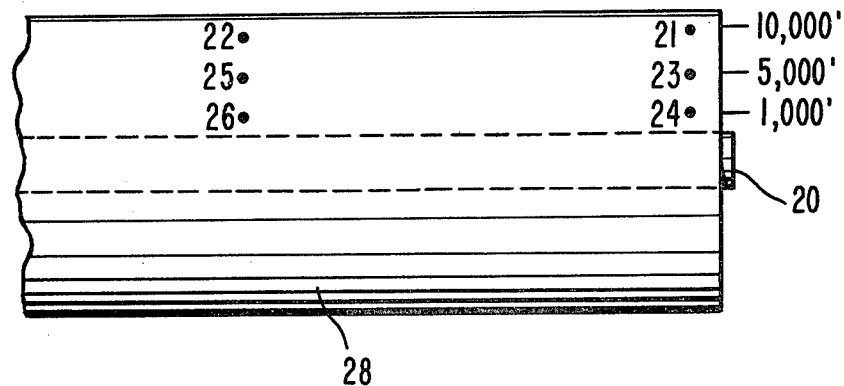
FIG. 5 is a schematic representation of a portion of a film roll showing points where coefficient of friction measurements were made after heat aging.

With reference to FIGS. 4 and 5 the film was wound into a roll 28 containing in excess of 10,000 feet of film on a hollow metal core 20. The rolls were placed in a room with circulating hot air at 120° F. for 72 hours at which time the coefficient of friction was measured at points 21-26, points 22, 25 and 26 being points midway the ends of the roll. The coefficient of friction in the mill roll at the end of 72 hours at 120° F. was as follows:

| Location | C.O.F. |
| --- | --- |
| 21 | .24 |
| 22 | .26 |
| 23 | .29 |
| 24 | .31 |
| 25 | .32 |
| 26 | .34 |

The resultant film functioned well on a cigarette package overwrap machine, and measurably better than the film prior to heat aging.

The films of the invention are heat-sealable films useful to the packaging art. The heat aged film of the Example when sealed on a Sentinal heat sealer at 10 p.s.i. for 0.5 secs. at 260° F. provided a T-seal having a strength between 0.8 and 1.2 lbs/inch width. Generally, the films of the invention are heat-sealable between about 200° F. to about 260° F. to provide seals having a strength of at least about 0.4 lbs./inch width.

There has been described above the invention and what are considered its best embodiments. It is to be understood that the invention can be practiced within the skill of the art otherwise than specifically shown. Other materials within the scope of the disclosure can be substituted for the materials in the Example to obtain results within the scope of the invention. It is pointed out that when a single compound or material has been described as useful, mixtures of compounds or materials can also be employed.

We claim:

1. A heat-sealable film consisting essentially of a corona discharge treated, biaxially oriented film comprising a blend of stereoregular polypropylene containing about 5% to about 25% by weight based on the total composition of a terpene-styrene or substituted styrene copolymer consisting of about 85% to about 25% terpene and about 15% to about 75% styrenic monomer.

2. The film of claim 1 wherein the copolymer consists of a copolymer of about 85% to about 40% terpene and about 15% to about 60% styrenic monomer.

3. The film of claims 1 or 2 wherein copolymer is a dipentene-styrene or limonene-styrene copolymer.

4. The film as in claim 3 wherein the copolymer consists of a copolymer of about 15% to about 30% styrene and about 85% to about 70% dipentene or limonene and has a ring and ball softening point above about 100° C.

5. A heat-sealable film as in claim 1 wherein the film in addition contains an antiblocking and/or slip agent functioning enhancing amount between about 0.5% to about 2% of a Fischer-Tropsch wax.

6. The film of claim 5 wherein the copolymer consists of a copolymer of about 85% to about 40% terpene and about 15% to about 60% styrenic monomer.

7. The film of claims 5 and 6 wherein copolymer is a dipentene-styrene or limonene-styrene copolymer.

8. The film as in claim 7 wherein the copolymer consists of a copolymer of about 15% to about 30% styrene and about 85% to about 70% dipentene or limonene and has a ring and ball softening point above about 100° C.

9. A heat-sealable film comprising a corona discharge treated, biaxially oriented film comprising a blend of stereoregular polypropylene containing about 5% to about 25% by weight based on the total composition of a terpene-styrene or substituted styrene copolymer consisting of a copolymer of about 85% to about 25% terpene and about 15% to about 75% styrenic monomer, and containing a coefficient of friction reducing, non-heat-seal preventing amount between about 0.02% to about 0.1% of a saturated fatty amide slip agent.

10. The film of claim 9 which has been aged at an elevated temperature for a time sufficient to reduce the coefficient of friction of the film.

11. The film of claims 9 or 10 wherein the copolymer consists of a copolymer of about 85% to about 40% terpene and about 15% to about 60% styrenic monomer.

12. The film of claim 11 wherein copolymer is a dipentene-styrene or limonene-styrene copolymer.

13. The heat-sealable film as in claim 9 wherein the amide comprises stearamide.

14. A heat-sealable film as in claim 9 wherein the film in addition comprises about 0.5% to about 2% of a Fischer-Tropsch wax.

15. The film of claim 14 wherein the copolymer consists of a copolymer of about 85% to about 40% terpene and about 15% to about 60% styrenic monomer.

16. The film of claim 14 wherein copolymer is a dipentene-styrene or limonene-styrene copolymer.

17. The film as in claim 14 wherein the copolymer consists of a copolymer of about 15% to about 30% styrene and about 85% to about 70% dipentene or limonene and has a ring and ball softening point above about 100° C.

18. A heat-sealable film as in claims 1, 5, 9 or 14 which in addition contains a particulate anti-blocking agent.

19. A method of forming a heat-sealable polypropylene film which comprises subjecting a biaxially oriented film consisting essentially of a film comprising a blend of stereoregular polypropylene containing about 5% to about 25% by weight based on the total composition of a terpene-styrene or substituted styrene copolymer consisting of about 85% to about 25% terpene and about 15% to about 75% styrenic monomer to a corona discharge in an amount sufficient to enhance the heat-sealability of the film.

20. The method as in claim 19 wherein the corona discharge is conducted in a manner such that the temperature of the film is maintained below about 150° F.

21. The method as in claim 19 wherein the corona discharge is conducted in a manner such that the temperature of the film is maintained between about 100° F. and about 130° F.

22. A method of forming a heat-sealable polypropylene film which comprises subjecting a biaxially oriented corona discharge treated film consisting essentially of a film comprising a blend of stereoregular polypropylene containing about 5% to about 25% by weight based on the total composition of a terpene-styrene or substituted styrene copolymer consisting of a copolymer of about 85% to about 25% terpene and about 15% to about 75% styrenic monomer, and containing a coefficient of friction reducing, non-heat-seal preventing amount between about 0.02% to about 0.1% of a saturated fatty amide slip agent to an aging at an elevated temperature for a time sufficient to reduce the coefficient of friction of the film.

23. A method of claim 22 wherein the heat aging is conducted with the film in roll form upon a core adapted to shorten the time required for all points with the roll to reach a predetermined temperature.

24. The method as in claim 22 wherein the core is a hollow core of a relatively heat conductive material.

25. A film having enhanced heat-sealability comprising a corona discharge treated, biaxially oriented film comprising a blend of stereoregular polypropylene containing about 5% to about 25% by weight based on the total composition of a terpene-styrene or substituted styrene copolymer consisting of a copolymer of about 85% to about 25% terpene and about 15% to about 75% styrenic monomer, where the film has been treated with corona discharge in an amount sufficient to enhance the heat sealability of the film, the corona discharge being conducted in a manner such that the temperature of the film is maintained below about 150° F.

26. The film as in claim 25 where the film temperature during corona discharge is maintained between about 100° F. and about 130° F.

27. The method as in claim 19 wherein the film in addition contains an antiblocking and/or slip agent functioning enhancing amount between about 0.5% to about 2% of a Fischer-Tropsch wax.

28. The method of claim 19 wherein the film comprises a blend of stereoregular polypropylene containing about 5% to about 25% by weight based on the total composition of a terpene-styrene or substituted styrene copolymer consisting of a copolymer of about 85% to about 25% terpene and about 15% to about 75% styrenic monomer, and containing a coefficient of friction reducing, non-heat-seal preventing amount between about 0.02% to about 0.1% of a saturated fatty amide slip agent.

29. The method of claim 28 wherein the film in addition comprises about 0.5% to about 2% of a Fischer-Tropsch wax.

30. The method of claim 22 wherein the amide comprises stearamide.

31. The method as in claim 22 wherein the film in addition comprises about 0.5% to about 2% of a Fischer-Tropsch wax.

* * * * *

UNITED STATES PATENT AND TRADEMARK OFFICE
CERTIFICATE OF CORRECTION

PATENT NO. : 4,394,235
DATED : July 19, 1983
INVENTOR(S) : John G. Brandt, Joyce H. Dickerson, William R. Schmitt It is certified that error appears in the above-identified patent and that said Letters Patent are hereby corrected as shown below:

Column 2, line 63, "C=" should be --C50--

Column 3, line 36, "0.08%" should be --0.8%--

Column 4, line 35, "materials" should be --material-- line 37, delete "the"

Column 5, line 32, "equilibrium" should be --equilibration-- line 49, "7 mil" should be --a 7 mil--

Signed and Sealed this

Fourth Day of October 1983

[SEAL]

Attest:

GERALD J. MOSSINGHOFF

Attesting Officer    Commissioner of Patents and Trademarks